United States Patent

[11] 3,601,882

| [72] | Inventor | James L. McRae |
| | | P.O. Box 4195, Meridian, Miss. 39301 |
| [21] | Appl. No. | 49,735 |
| [22] | Filed | June 25, 1970 |
| [45] | Patented | Aug. 31, 1971 |

[54] METHOD FOR BUILDING WALL PANELS
11 Claims, 3 Drawing Figs.

[52] U.S. Cl. ................................................. 29/407,
29/200 A, 29/430, 29/432, 144/318
[51] Int. Cl. ................................................. B23q 17/00
[50] Field of Search ........................................ 29/430,
407, 432, 200 A; 144/318

[56] References Cited
UNITED STATES PATENTS

| 2,574,163 | 11/1951 | Bamford | 29/430 UX |
| 2,757,447 | 8/1956 | Barenyi | 29/430 |
| 3,034,208 | 5/1962 | Kime | 29/407 |
| 3,212,694 | 10/1965 | Sanford | 29/200 A UX |
| 3,399,445 | 9/1968 | Carroll | 29/430 X |
| 3,443,303 | 5/1969 | Groat | 29/430 |
| 3,557,439 | 1/1971 | Dykeman | 29/430 |

Primary Examiner—Charlie T. Moon
Attorney—David H. Semmes

ABSTRACT: Method for custom manufacturing housing wall panels of the type including parallel top and bottom plates, intersected by a plurality of vertically extending studs, particularly an assembly line system for cutting, marking and assembling plates and stud components.

PATENTED AUG 31 1971　　3,601,882

INVENTOR
JAMES L. McRAE

BY David H. Semmes
ATTORNEY

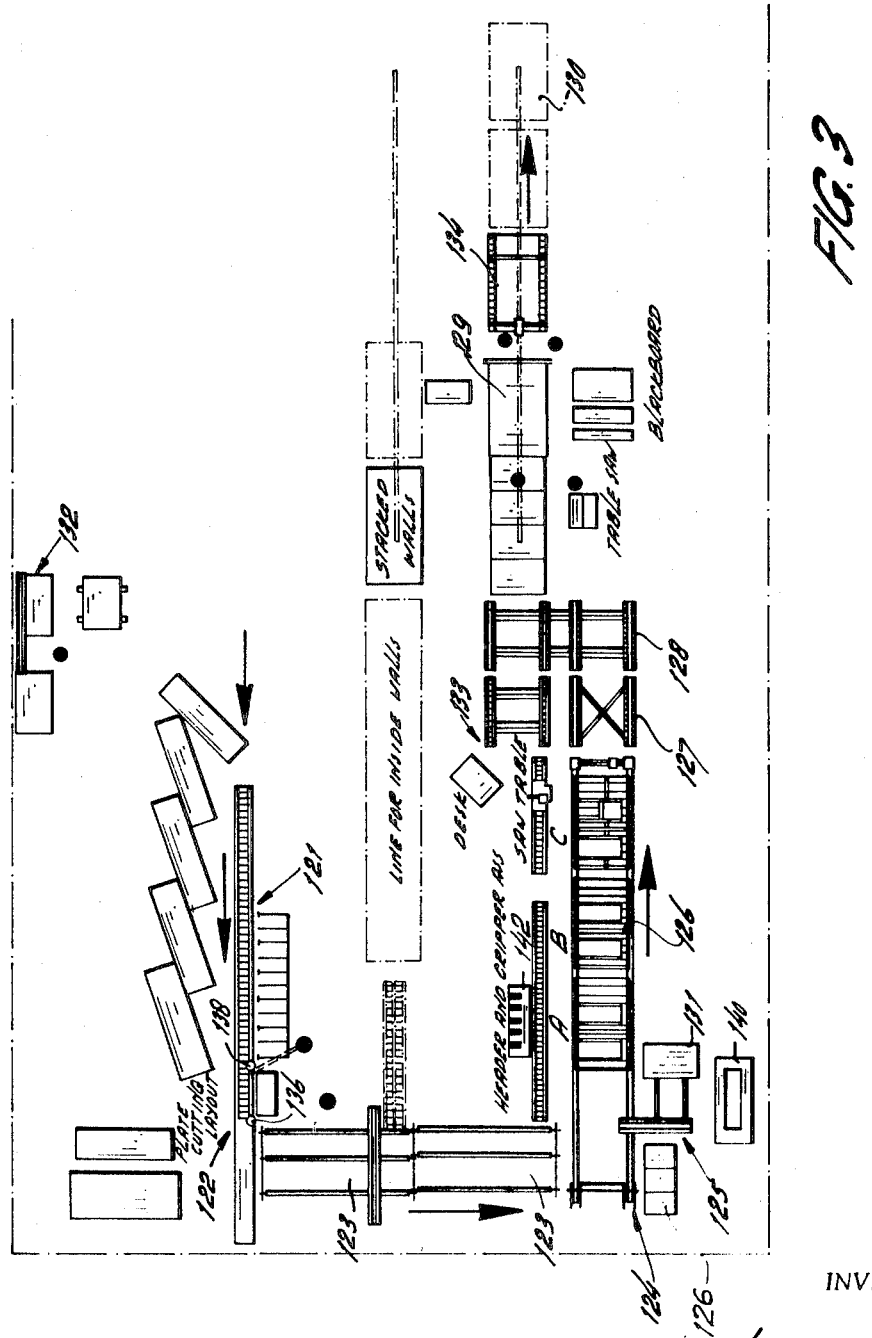

METHOD FOR BUILDING WALL PANELS

BACKGROUND OF THE INVENTION

1. Field of the Invention

Custom manufacture of house wall panels, as contrasted to prefabrication of standardized house wall panels. Numerous previous inventors have addressed themselves to the problem of prefabricating standardized wall panels, wherein an assembly line system is directed to marking and cutting of top and bottom plate, as well as sill, header and cripper components for the window and door areas. However, most such assembly systems have required that assembly line personnel converge upon a specific cutting area or nailing area. Alternatively, the wall panel has been moved from one station to another for the several marking, cutting and assembly steps. Moving of the bulky wall panel is extraordinarily time consuming and expensive.

2. Description of the Prior Art

Pertinent prior art includes:

| U.S. Pat. No. 3,443,303 | "Kingsberry Homes Process and Apparatus for Forming a Building Structure" |
|---|---|
| U.S. Pat. No. 3,479,734 | "Process and Apparatus for setting Nails in Elongated Members" |

SUMMARY OF THE INVENTION

According to the present method of building a wall panel, the assembly includes a continuous in-line flow of wall panel components, including a plate cutting and layout axial conveyance, a cross conveyor and a wall panel assembly longitudinal conveyor at the other end of the cross conveyor. Headers, crippers and sills are cut and marked simultaneously with the plates then cross conveyed into a longitudinal panel construction conveyance. The top and bottom plates are then introduced on either side of the longitudinal converging studs. Tee's and corners are introduced laterally intermediate the studs and assembled while longitudinally advancing the assembly, the lead-in is applied transversely of the studs, and the entire wall panel is flipped over for finishing of the crippers, inspection and applying of sheathing to the exterior side. The finished wall panel may be loaded directly onto a truck. Since the templates are used to mark the top and bottom plates with stud locations, no further use of plans is required after the templates have been laid out.

In the conventional homebuilding industry, the building site carpenter is required to originate and complete wall panels by tediously cutting and laying out plates, studs, packers, Tee's and corners. He is required to perform this operation manually under adverse conditions and essentially is a job engineer. According to present method, the labor and engineering of wall panels is transferred from the job site to factory with consequent savings in time and cost of building and erecting wall panels.

BRIEF DESCRIPTION OF THE DRAWINGS

FIG. 3 is a schematic view of the present method showing continuous in-line flow of building materials through the plate cutting and marking, cross conveying and final assembling steps.

DESCRIPTION OF THE PREFERRED EMBODIMENTS

Figure 1:
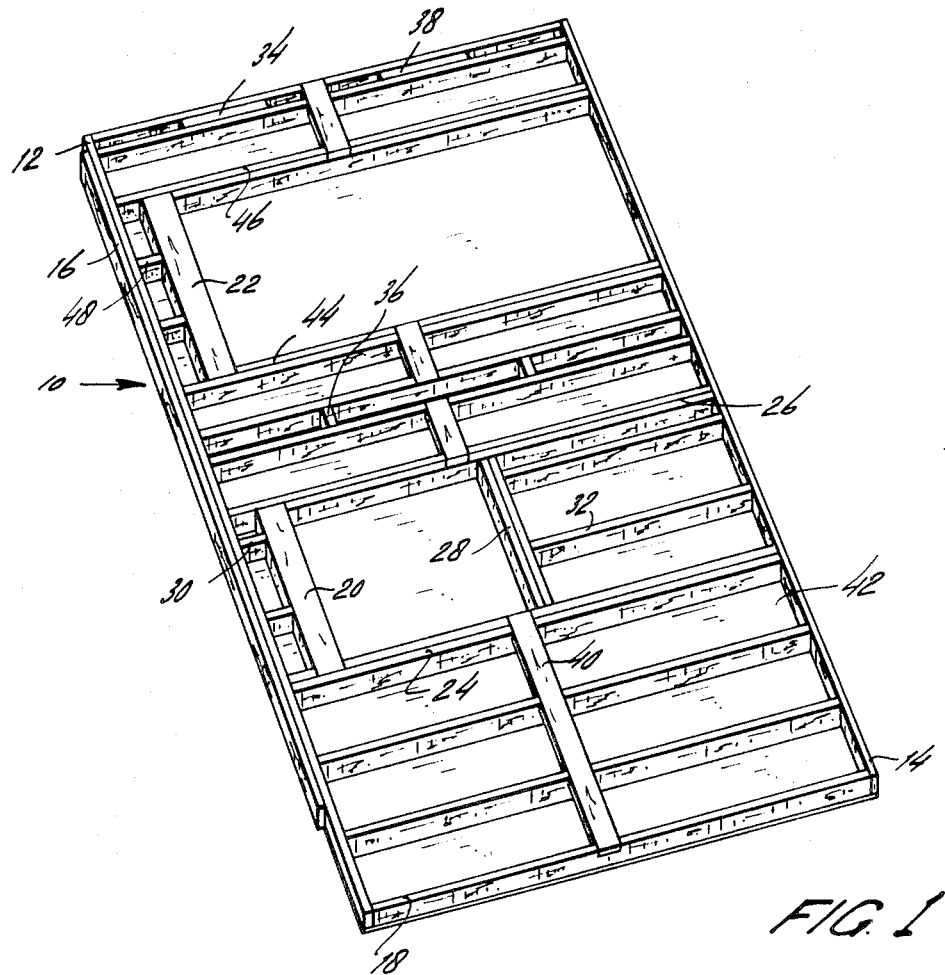
FIG. 1 is a perspective of a wall panel of the general type which can be readily manufactured according to present process.
Figure 2:
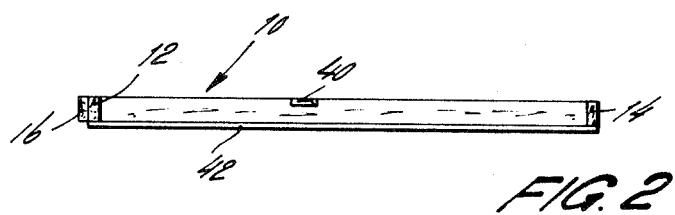
FIG. 2 is an end elevation thereof.

In FIG. 1 there is illustrated a top plate 12, having a cap plate 16, a bottom plate 14 with a plurality of vertically extending intersecting studs 18. These studs may be notched at their midsection so as to receive complementally 1×4 let-in or inlet 40. The let-in stabilizes and aligns stud and packer elements during assembly and, if not cutout at the door and window apertures, serves as a convenient means for handling the wall panel during shipment. Packers 24 and 26 are inserted adjacent sill 28 and header 20, sill 28 being stabilized by crippers 32 and header 20 being stabilized by crippers 30. Similar packers 44 and 46 may be positioned adjacent header 22 which may have a plurality of crippers 48. A Tee 36 may be employed as a partition lead for an interior wall and a specially constructed corner 34 may be manufactured from the stud lengths and have a plurality of short pieces 38 therebetween so as to give the proper width. Manifestly, the packers, Tee's and corners may be variously manufactured so as to have the interior pieces 34 and 38 at right angles or parallel to the vertically extending stud member pieces, as illustrated.

According to the present method, templates are cut from light stock, such as 1/8 inch by 2 inch, into the desired top and bottom plate lengths. The templates bear, also stud locations, as well as header, sill and cripper locations. The 2 × 4 inches plate stock is axially advanced into the plate cutting layout area. The templates are positioned adjacent the plate stock which is then cut by saw 136. Headers, crippers and sills may be cut by law 138. Then, the top and bottom plates are marked with stud locations and advanced with header, cripper and sills as a package across cross conveyor 123. As will be apparent, cross conveyor 123 actually consists of two intersecting conveyors, so that the flow of materials can be regulated either at the plate cutting and layout end or at the wall panel assembly end. As plate cutting and layout is completed, the studs are cut and notched at 132, the advanced to the stud bin 131 from which they are injected laterally as at 125 into longitudinal conveyor 124. Packers, Tee's and corners are marked, cut and assembled at 140, placed into bins 126 from which they are injected laterally with the studs into the longitudinal conveyor 124. As the package of plates, headers, crippers and sills is advanced to the longitudinal assembly conveyor 124, the headers, crippers and sills are removed to the header and cripper assembly area 142 where they are assembled. The top and bottom plates are placed on either side of the longitudinal conveyor and the studs, packers, corners and Tee's are introduced laterally into the advancing conveyor. The studs are nailed at step A, the headers, crippers and sills are nailed at step B, the cap plate, as well as the 1 × 4 let-in are nailed at step C. This work is manual. The completely walled panel is then advanced onto a speedup conveyor 127 which positions the panel upon a flip table 128 where it is flipped 180° so that the wall panel may be inspected as at 133 and the crippers completed by the inspector nailing on the exterior side of panel. The panel is then advanced into squaring unit 129 where the wall panel is squared and the blackboard is nailed to the exterior and routed in the window and door areas. The blackboard is stapled onto the panel exterior and trimmed at 134, then the panel may be advanced by overhead hoist track to a storage area or a truck trailer.

As will be apparent, the present method enables the stationary positioning of expert personnel, while eliminating the time consuming and arduous task of moving the wall panels manually. A single person may operate the stud notcher 132, another operator may operate the packer buildup 140, two individuals may operate at the plate cutting and layout as well as header-cripper position 21. A single personnel may separate the plates on either side of the longitudinal conveyance and four or five people may assemble the studs, let-in headers, crippers and sills. The blackboard sheathing may be applied by two people. It is estimated that according to the present method such a crew can manufacture 5,000 lineal feet of wall panel per eight hour shift.

With the use of applicant's method, walls may now be built on a continuous flow production process where each wall is built according to its own specifications (i.e. custom built) as it moves along the production line. All of the necessary parts are automatically put into the line at feeder points with these parts either precut or preassembled as required.

It is not necessary with the use of this process to arrange for any precutting or preassembly of parts before a particular wall fabrication job is to start, as the system is designed so that all necessary cutting and preassembling is done in the "continuous flow" process. All storage bins and stock piles around the assembly table are eliminated.

Wall studs are straightened by the use of a 1 ×4 in-let continuous ribbon at mid height. They are pulled into alignment in the longitudinal direction by the fact that it is continuously moving from one stud to the next and tends to pull out or push in crooked studs. They are straightened in the lateral direction by aligning the stud with the layout mark that was placed on the 1 × 4 during the plate layout process.

This system allows the original plate layout work to be done in a location remote to the fabrication process by the use of 1/8 ×2 inches wood template strips. This layout work can now be done in a clean, properly prepared work place that is considerably better suited for the degree of concentration required. Previous to this system the layout work was usually done in the same area where the cutting and fabrication process was taking place and was subject to considerable noise, dust, and confusion.

This process allows the studs to be nailed into exterior walls from the side that will be to the inside of the house. Usually it was custom to build these walls from the exterior side so that the blackboard could be applied to the studs after they has been nailed in place and it was not possible to see the bottom side or inside face of the wall so that in many cases there was faulty workmanship which was hidden. Now the wall is first built from this inside face up position and then flipped over and the blackboard applied.

With the use of this process, the production rate can be more accurately predicted because the men are working at a "paced" rate of speed rather than under the old way of working at their own pace. This has eliminated many delays and waiting periods that were evident in the old process due to the workmen taking time out for conversation or other unnecessary activities. If the production rate can be accurately predicted, the scheduling to the job can be so that overtime work will not be required.

Using the layout template system where the layout marks and other information is transferred to the wall plates before the assembly process begins makes it possible to use only one template rather than two that was the usual practice in the past. The two templates were usually placed in a recessed groove on each side of a fixed table and the precut framing members then placed on top of the layout marks. The wall was then nailed together by the workmen. The one smaller template also takes considerably less storage space.

Another advantage of the layout system is that as the layout marks are transferred to the plates, and there remains as evidence of exactly what was supposed to have been built. Under the old system of laying the templates in the table, there was no mark on the plates in order for the inspector to verify whether the wall had been built like the templates or if the studs had been accurately placed to the mark.

All necessary fabrication information is put on the layout strip thereby eliminating any need for additional work orders, cut lists, preassembly orders, or other type paper work to get the job produces.

By the use of the cross conveyor and the continuous flow concept, the sequence of the work to be built will be determined by the order in which the plates are cut from the layout strip. This means a stacking or job erection plan can be made in advance by merely arranging the layout strip in the order desired.

The packers, Tee's, and corners are built from the same supply as the wall stud supply thereby eliminating any possible error of using the wrong length or grade material to make up these items.

Manifestly, various types of conveyances and saws may be employed without departing from the spirit of the invention as defined.

I claim:
1. Method for building wall panels of the type including top and bottom plates intersected by a plurality of vertically extending studs comprising:
   A. cutting templates for said top and bottom plates and marking said templates with stud locations;
   B. positioning said templates adjacent plate stock, cutting said plate stock into top and bottom plates with stud locations, while using said templates as a guide;
   C. laterally moving said plates upon a cross conveyor extending from said cutting and marking, then feeding said plates at either side of a longitudinal conveyor extending transversely to said cross conveyor;
   D. cutting said studs, then feeding said studs laterally into said longitudinal conveyor, so as to intersect said plates; and
   E. assembling and nailing said studs to said plates on one side as a wall panel, while advancing said panel longitudinally upon said longitudinal conveyor.
2. Method for building wall panels of the type including top and bottom plates as in claim 1, including:
   F. flipping said panel over, and nailing the other side of said panel.
3. Method for building wall panels of the type including top and bottom plates as in claim 2, including nailing sheeting to said other side.
4. Method for building wall panels of the type including top and bottom plates as in claim 3, including:
   G. cutting and marking headers, crippers and sills simultaneously with said top and bottom plates and laterally moving said headers, crippers and sills upon said cross conveyor as a package with said plates.
5. Method for building wall panels of the type including top and bottom plates as in claim 4, including:
   H. removing said headers, crippers and sills prior to feeding said top and bottom plates into said longitudinal conveyor; separately nailing said headers, crippers and sills as a complete assembly, then injecting said assembly intermediate said studs in said advancing wall panel.
6. Method for building wall panels of the type including top and bottom plates as in claim 5, including:
   I. cutting and nailing together packets from pairs of studs and injecting said packers simultaneously with said studs into said longitudinal conveyor for wall panel assembly.
7. Method for building wall panels as in claim 6, including:
   J. nailing together corners and Tee's from pairs of studs, and injecting said corners and Tee's simultaneously with said studs into said longitudinal conveyor.
8. Method for building wall panels of the type including top and bottom plates as in claim 7, including:
   K. notching while cutting said studs for lead-in assembly and sequentially of nailing said studs to said plates nailing said lead-in assembly within stud notches so as to extend transversely across said studs.
9. Method for building wall panels of the type including top and bottom plates as in claim 8, including:
   L. feeding said plate stock axially longitudinally into the area of said cutting and marking.
10. Method for building wall panels of the type including top and bottom plates as in claim 9, including:
    M. storing said templates perpendicularly to said cutting and marking of said plate stock.
11. Method for building wall panels of the type including top and bottom plates as in claim 10, including:
    N. laterally moving said packaging of plates, headers, crippers and sills at varying speeds upon said cross conveyor, so as to deliver individual said packages to said longitudinal conveyor, as the work crew is ready to assemble the next wall panel.